United States Patent
Han et al.

(10) Patent No.: US 11,085,220 B2
(45) Date of Patent: Aug. 10, 2021

(54) STOPPER APPARATUS FOR VEHICLE TAILGATE

(71) Applicants: Hyundai Motor Company, Seoul (KR); Kia Motors Corporation, Seoul (KR)

(72) Inventors: Doo Hee Han, Seoul (KR); In Soo Jung, Gyeonggi-do (KR); Myung Taek Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 589 days.

(21) Appl. No.: 15/985,311

(22) Filed: May 21, 2018

(65) Prior Publication Data

US 2019/0162005 A1 May 30, 2019

(30) Foreign Application Priority Data

Nov. 28, 2017 (KR) .......................... 10-2017-0160395

(51) Int. Cl.
*E05F 5/02* (2006.01)
*B60J 5/10* (2006.01)
(Continued)

(52) U.S. Cl.
CPC ............... *E05F 5/025* (2013.01); *B60J 5/107* (2013.01); *E05B 77/36* (2013.01); *E05B 83/18* (2013.01); *E05B 85/045* (2013.01); *E05F 5/022* (2013.01); *E05Y 2201/22* (2013.01); *E05Y 2900/546* (2013.01)

(58) Field of Classification Search
CPC ...... E05B 77/38; E05B 83/16; E05B 15/0006; E05B 77/36; E05B 15/022; E05B 85/04; E05B 77/42; E05B 15/0255; E05B 2015/027; E05B 45/083; E05B 83/24; E05B 83/18; E05B 85/045; Y10T 292/68; Y10T 292/688; Y10T 16/61; Y10T 292/691; Y10T 292/71; Y10T 16/629; E05C 17/54; E05C 19/007; E05Y 2900/546; E05Y 2900/548; E05Y 2201/22; Y10S 292/40; Y10S 292/42; Y10S 16/06; Y10S 292/43;
(Continued)

(56) References Cited

U.S. PATENT DOCUMENTS

| 5,069,491 A * | 12/1991 | Weinerman ........... E05B 77/265 292/48 |
| 8,128,138 B2 * | 3/2012 | Bambenek ............ E05B 85/045 292/340 |

(Continued)

FOREIGN PATENT DOCUMENTS

| KR | 10-2017-0068101 | 6/2017 |
| KR | 10-2017-0085198 | 7/2017 |

*Primary Examiner* — Mark A Williams
(74) *Attorney, Agent, or Firm* — Mintz Levin Cohn Ferris Glovsky and Popeo, P.C.; Peter F. Corless (57) ABSTRACT

A stopper apparatus for a tailgate of a vehicle includes a latch mechanism mounted on the tailgate of the vehicle, one or more first stopper members secured to the latch mechanism, a striker attached to a vehicle body structure, and a second stopper member disposed around the striker. The second stopper member receives part of the latch mechanism and the first stopper members to constrain the latch mechanism and the first stopper members.

10 Claims, 12 Drawing Sheets

(51) Int. Cl.
  *E05B 83/18* (2014.01)
  *E05B 85/04* (2014.01)
  *E05B 77/36* (2014.01)

(58) Field of Classification Search
  CPC ...... Y10S 292/56; Y10S 292/73; E05F 5/025;
    E05F 5/022; B60J 5/107
  See application file for complete search history.

(56) References Cited

U.S. PATENT DOCUMENTS

| | | | |
|---|---|---|---|
| 8,439,409 B2 * | 5/2013 | Uto | E05B 85/02 |
| | | | 292/340 |
| 8,534,745 B1 * | 9/2013 | Quinn | E05B 85/045 |
| | | | 296/146.9 |
| 9,316,021 B2 * | 4/2016 | Burciaga | E05B 15/0295 |
| 9,617,763 B2 * | 4/2017 | Graute | E05B 77/36 |
| 10,450,785 B2 * | 10/2019 | Osti | E05F 5/022 |
| 2007/0241570 A1 * | 10/2007 | Paskonis | E05B 85/045 |
| | | | 292/340 |
| 2011/0025079 A1 * | 2/2011 | Paskonis | E05B 85/045 |
| | | | 292/341.15 |
| 2011/0198872 A1 * | 8/2011 | Gentile | E05B 85/045 |
| | | | 292/341.15 |
| 2013/0031843 A1 * | 2/2013 | Thorpe | E05B 77/36 |
| | | | 49/503 |
| 2013/0285395 A1 * | 10/2013 | Burciaga | E05B 85/045 |
| | | | 292/340 |
| 2014/0117678 A1 * | 5/2014 | Thorpe | E05B 85/02 |
| | | | 292/2 |

* cited by examiner

STOPPER APPARATUS FOR VEHICLE TAILGATE

CROSS-REFERENCE TO RELATED APPLICATION

This application claims under 35 U.S.C. § 119(a) the benefit of Korean Patent Application No. 10-2017-0160395, filed on Nov. 28, 2017 in the Korean Intellectual Property Office, the entire contents of which are incorporated by reference herein.

BACKGROUND

(a) Technical Field

The present disclosure relates to a stopper apparatus for a vehicle tailgate, more particularly, to a stopper apparatus for a vehicle tailgate that restricts movement of a latch mechanism while the latch mechanism and a striker are engaged with each other, thereby preventing movement of the vehicle tailgate and thus effectively reducing booming, noise, and the like.

(b) Description of the Related Art

Vehicles such as hatchbacks, sports utility vehicles (SUVs), recreational vehicles (RVs), vans, and the like have a tailgate at the back thereof, and the tailgate is a kind of back door for access to a rear cargo space, such as a rear storage compartment.

Such a tailgate may be pivotally attached to a back of a vehicle and may be configured to open/close a rear opening of the vehicle. A latch mechanism may be mounted on the tailgate, and a striker may be attached to a vehicle body structure. The tailgate may be locked to back of the vehicle by engagement of the latch mechanism and the striker in a state in which the tailgate is closed to cover the rear opening of the vehicle.

Meanwhile, a load generated by engine vibration exiting force while the vehicle is travelling may be transmitted to the tailgate through a vehicle driveline or a vibration transfer path of the vehicle. The load transmitted to the tailgate may move the tailgate in a front-rear direction of the vehicle, and the movement of the tailgate may excite an indoor sound field to generate booming, also referred to herein as "lock-up booming."

A dynamic damper may be employed to improve the booming caused by the behavior of the tailgate, thereby reducing the booming due to a resonant frequency of the tailgate. However, the dynamic damper may cause a rise in manufacturing cost and an increase in the weight of the vehicle.

Further, the dynamic damper may not be applicable depending on the structure of the vehicle, and therefore the application of the dynamic damper may be extremely limited depending on the structure of the vehicle.

Recently, a structure has been disclosed which reduces booming by mounting a rubber bush or a guide bumper to a mounting part of the striker to make the resonant frequency of the tailgate different from the frequency at which the booming of the tailgate occurs. However, the rubber bush or the guide bumper has low durability and may not prevent noise caused by the tailgate.

In particular, the latch mechanism may move upwards and downwards relative to the striker while the tailgate is locked to the vehicle body structure by the latch mechanism and the striker, and the tailgate may move forwards and rearwards due to the vertical movement of the latch mechanism. The forward and rearward movement of the tailgate may cause lock-up booming.

As described above, the tailgate in the related art may not appropriately restrict the upward and downward behavior of the latch mechanism, and therefore it may be difficult to prevent lock-up booming and noise caused by the forward and rearward movement of the tailgate.

SUMMARY

An aspect of the present disclosure provides a stopper apparatus for a vehicle tailgate that restricts movement of a latch mechanism while the latch mechanism and a striker are engaged with each other, thereby preventing movement of the tailgate and thus effectively reducing booming, noise, and the like.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a stopper apparatus for a tailgate of a vehicle includes a latch mechanism mounted on the tailgate of the vehicle, one or more first stopper members secured to the latch mechanism, a striker attached to a vehicle body structure, and a second stopper member disposed around the striker. The second stopper member receives a part of the latch mechanism and the first stopper members to constrain the latch mechanism and the first stopper members.

The second stopper member may be secured to the striker through a fitting protrusion and a fitting groove.

The fitting protrusion may be secured to a base plate of the striker, and the fitting groove may be formed on the second stopper member. The fitting protrusion may fit into the fitting groove to secure the second stopper member to the base plate of the striker.

The second stopper member may have a receiving opening in which to receive the part of the latch mechanism.

The second stopper member may include a first wall, a second wall connected to one end of the first wall, and a third wall connected to an opposite end of the first wall, and the receiving opening may be delimited by the first wall, the second wall, and the third wall.

An inclined surface may be formed on an inner side of the second wall and the third wall.

The second stopper member may have receiving apertures in which the first stopper members are received, and the receiving apertures may restrict the first stopper members from moving upwards, downwards, leftwards, and rightwards.

The receiving apertures may have a first stopper surface and a second stopper surface that restrict the first stopper members from moving upwards and downwards.

The receiving apertures may have a third stopper surface and a fourth stopper surface that restrict the first stopper members from moving leftwards and rightwards.

The third stopper surface and the fourth stopper surface may be inclined.

According to the present disclosure, by restricting a movement of a latch mechanism while the latch mechanism and a striker are engaged with each other, it is possible to prevent a movement of a tailgate and thus effectively reduce booming, noise, and the like.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

Terms, such as "first", "second", "A", "B", "(a)", "(b)", and the like, may be used herein to describe elements of the present disclosure. Such terms are only used to distinguish one element from another element, and the substance, sequence, order, or number of these elements is not limited by these terms. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
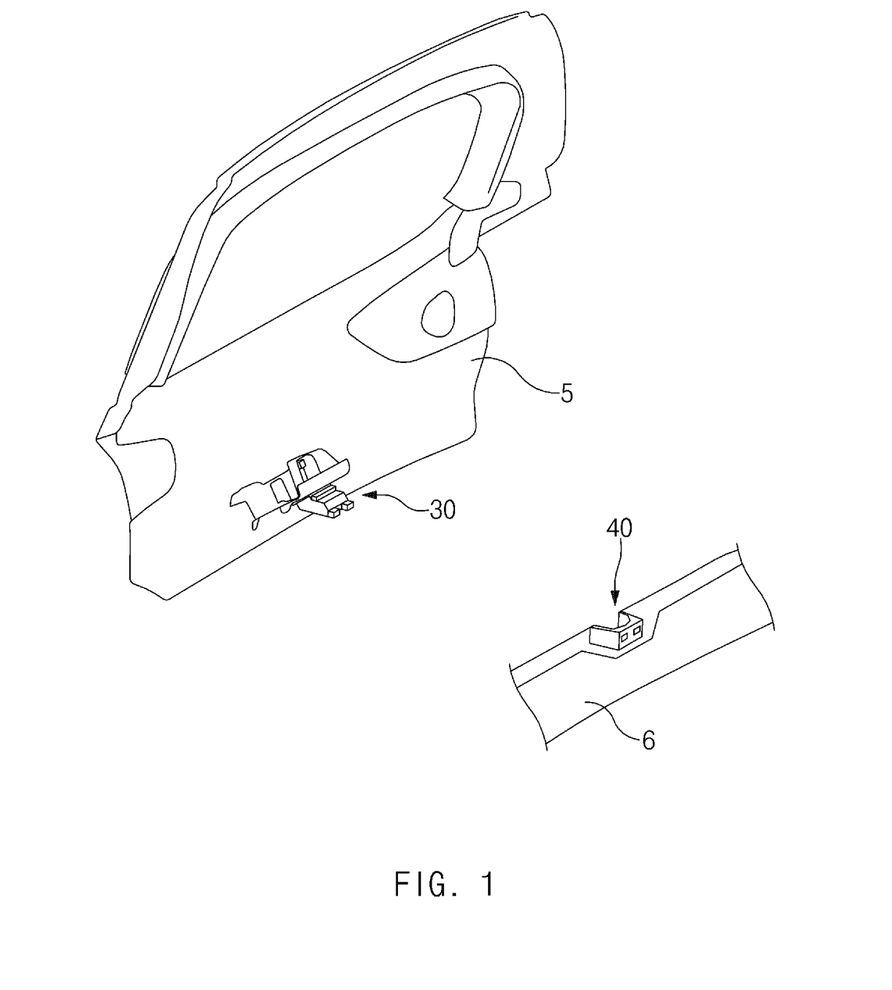
FIG. 1 illustrates a state in which a tailgate is open so as not to cover a rear opening of a vehicle.
Figure 2:
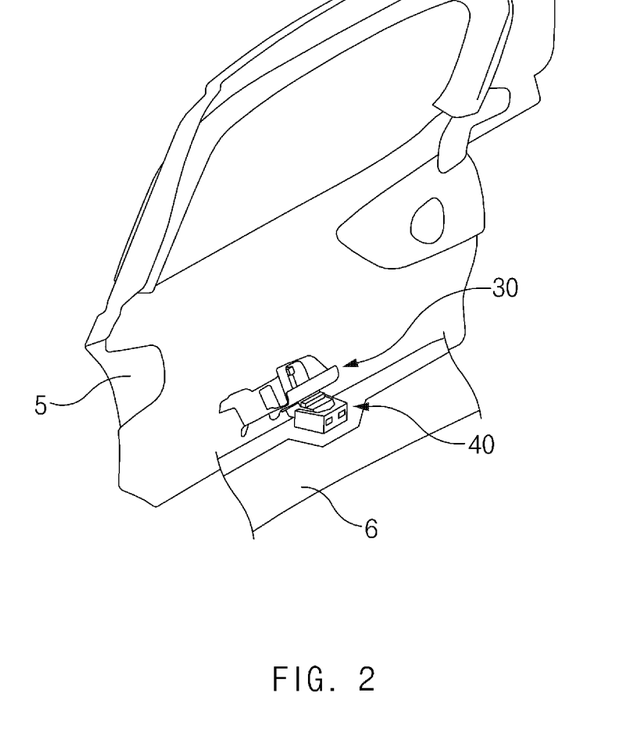
FIG. 2 illustrates a state in which the tailgate is closed to cover the rear opening of the vehicle.

FIG. 1 illustrates a state in which a tailgate 5 is open so as not to cover a rear opening of a vehicle, and FIG. 2 illustrates a state in which the tailgate 5 is closed to cover the rear opening of the vehicle.

Referring to FIGS. 1 and 2, a latch mechanism 30 may be mounted on a lower side of the tailgate 5, and a striker 40 may be attached to a vehicle body structure 6. The vehicle body structure 6 may be a member, a frame, or the like that is disposed around the rear opening of the vehicle. As illustrated in FIG. 1, the latch mechanism 30 may be disengaged from the striker 40 when the tailgate 5 is opened so as not to cover the rear opening of the vehicle, and as illustrated in FIG. 2, the latch mechanism 30 may be engaged with the striker 40 when the tailgate 5 is closed to cover the rear opening of the vehicle.

A stopper apparatus 10 for a vehicle tailgate according to an embodiment of the present disclosure may include one or more first stopper members 11 secured to the latch mechanism 30 and a second stopper member 12 attached to the striker 40.

The one or more first stopper members 11 may be secured to an end portion of the latch mechanism 30. Accordingly, the first stopper members 11 may move together with the latch mechanism 30. For example, the first stopper members 11 may be bonded to the end portion of the latch mechanism 30 through an adhesive, or may be integrated with the latch mechanism 30.

Each of the first stopper members 11 may have a first stopper surface 51 and a second stopper surface 52 that are opposite to each other, and the first stopper surface 51 and the second stopper surface 52 may be formed to be flat.

The first stopper member 11 may have a third stopper surface 53 and a fourth stopper surface 54 that are opposite to each other, and the third stopper surface 53 and the fourth stopper surface 54 may be formed to be flat.

Figure 3:
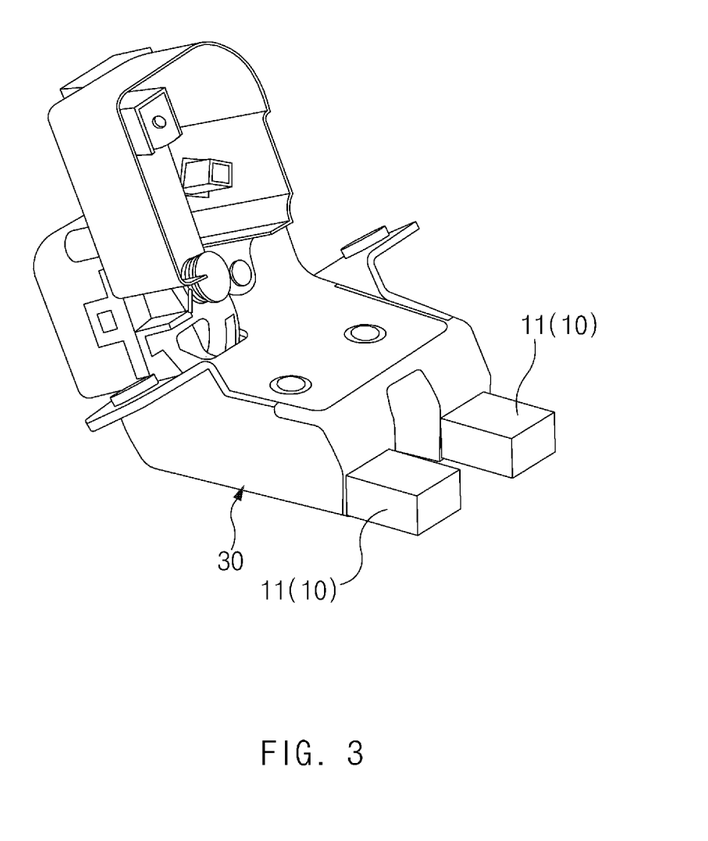
FIG. 3 illustrates first stopper members of a stopper apparatus for a vehicle tailgate, according to an embodiment of the present disclosure.

According to an embodiment, as illustrated in FIG. 3, two first stopper members 11 may be symmetrically secured to the end portion of the latch mechanism 30.

According to another embodiment, one, three or more first stopper members 11 may be secured to the end portion of the latch mechanism 30.

Figure 4:
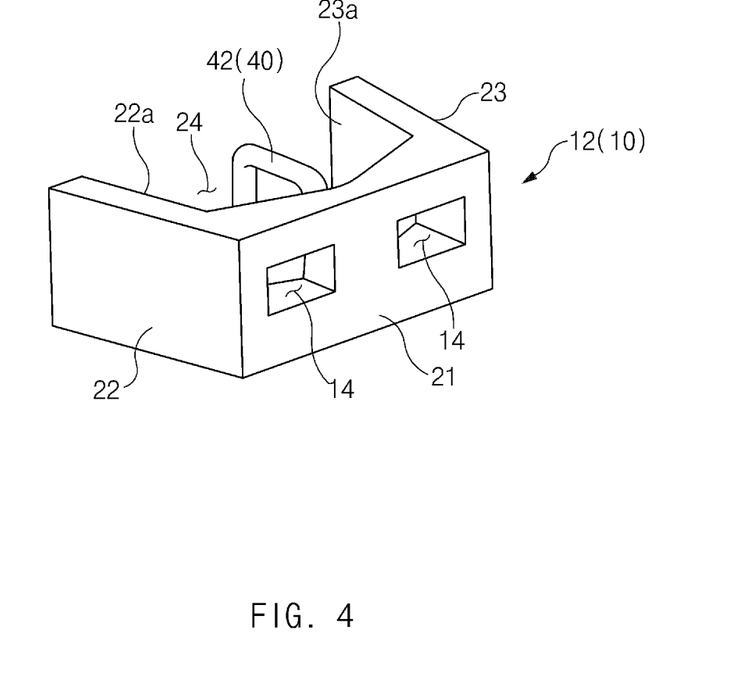
FIG. 4 illustrates a second stopper member of the stopper apparatus for the vehicle tailgate, according to an embodiment of the present disclosure.
Figure 5:
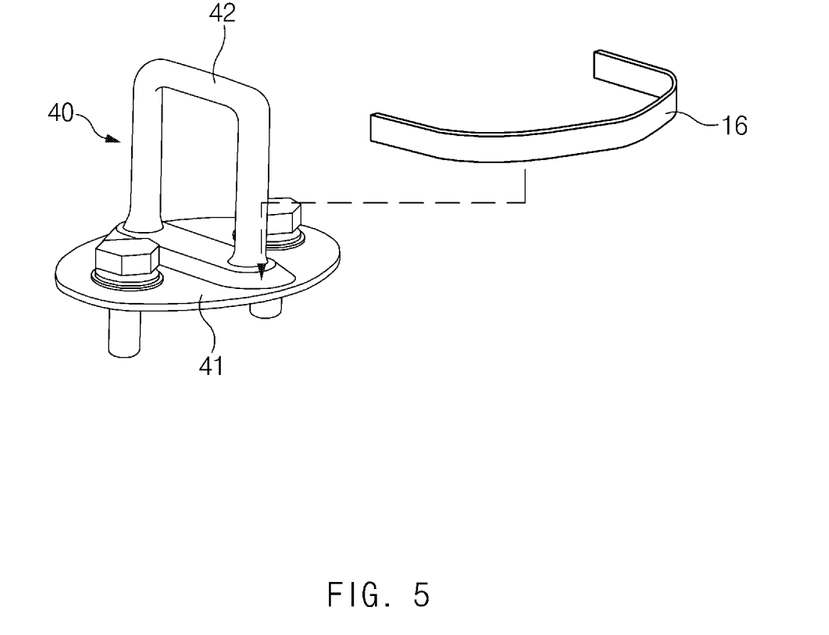
FIG. 5 illustrates a fitting protrusion of the stopper apparatus for the vehicle tailgate, according to an embodiment of the present disclosure.
Figure 6:
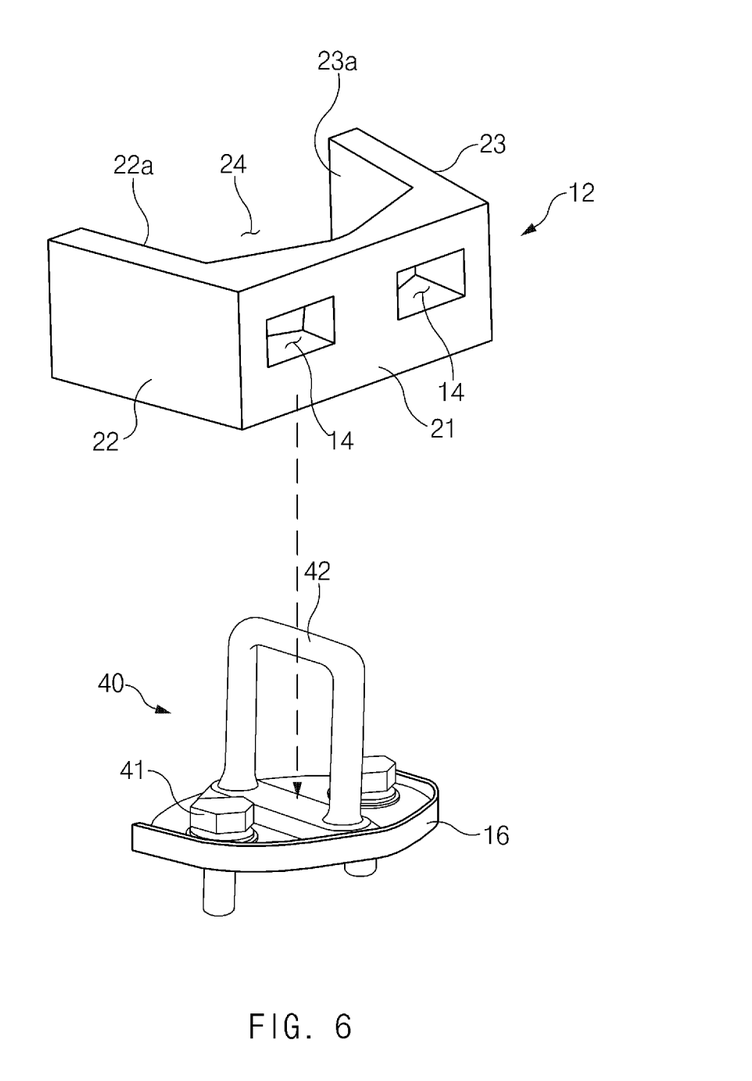
FIG. 6 illustrates a process in which the second stopper member of the stopper apparatus for the vehicle tailgate is combined with a base plate of a striker through the fitting protrusion, according to an embodiment of the present disclosure.
Figure 7:
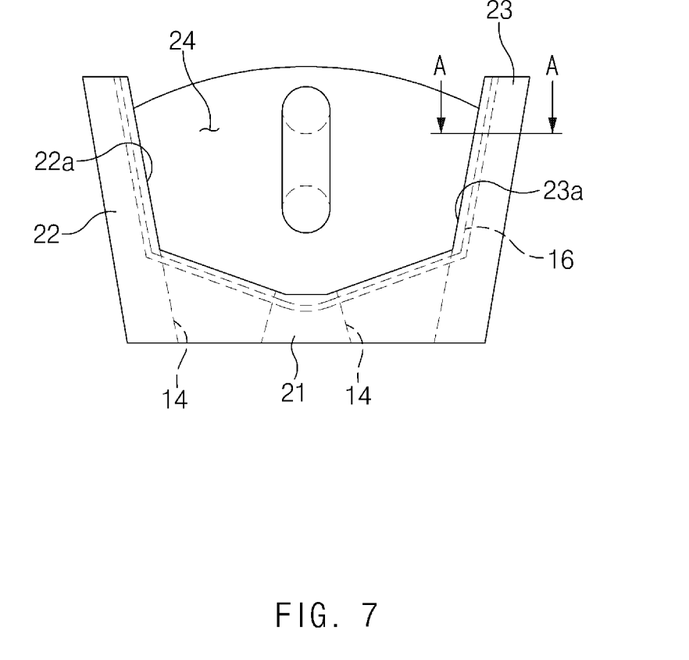
FIG. 7 illustrates a plan view of the second stopper member of the stopper apparatus for the vehicle tailgate, according to an embodiment of the present disclosure.

As illustrated in FIG. 4, the second stopper member 12 may be attached to a base plate 41 of the striker 40 and may be configured to surround a striker pin 42 of the striker 40.

According to an embodiment, the second stopper member 12 may be formed of a buffer material, such as rubber.

The second stopper member 12 may have a receiving opening 24 in which to receive a part of the latch mechanism 30. The second stopper member 12 may have a first wall 21, a second wall 22 connected to one end of the first wall 21, and a third wall 23 connected to an opposite end of the first wall 21. An opposite side to the first wall 21 of the second stopper member 12 may be open, and therefore the latch mechanism 30 may enter the receiving opening 24. The receiving opening 24 may be delimited by the first wall 21, the second wall 22, and the third wall 23.

When the tailgate 5 is closed to cover the rear opening of the vehicle, the latch mechanism 30 may be received in the receiving opening 24 of the second stopper member 12 and may be engaged with the striker 40. In this case, the first wall 21 may restrict the latch mechanism 30 from moving forwards and rearwards, and the second wall 22 and the third wall 23 may restrict the latch mechanism 30 from moving leftwards and rightwards.

The second wall 22 may have, on an inner side thereof, an inclined surface 22a inclined at a predetermined inclination angle, and the third wall 23 may have, on an inner side thereof, an inclined surface 23a inclined at a predetermined inclination angle.

The inclined surface 22a of the second wall 22 and the inclined surface 23a of the third wall 23 may allow the latch mechanism 30 to be stably received in the receiving opening 24 of the second stopper member 12 even when the latch mechanism 30 has an assembly tolerance or a manufacturing error. Accordingly, the tailgate 5 may stably cover the rear opening of the vehicle.

As illustrated in FIG. 4, the second stopper member 12 may have one or more receiving apertures 14 formed in the first wall 21, and the first stopper members 11 may be received in the receiving apertures 14. When the latch mechanism 30 is received in the receiving opening 24 of the second stopper member 12, the first stopper members 11 of the latch mechanism 30 may be received in the receiving apertures 14 of the second stopper member 12 to effectively restrict the latch mechanism 30 from moving forwards, rearwards, upwards, and downwards.

The number of receiving apertures 14 may correspond to the number of first stopper members 11, and the receiving apertures 14 may be formed at positions corresponding to the first stopper members 11.

Figure 11:
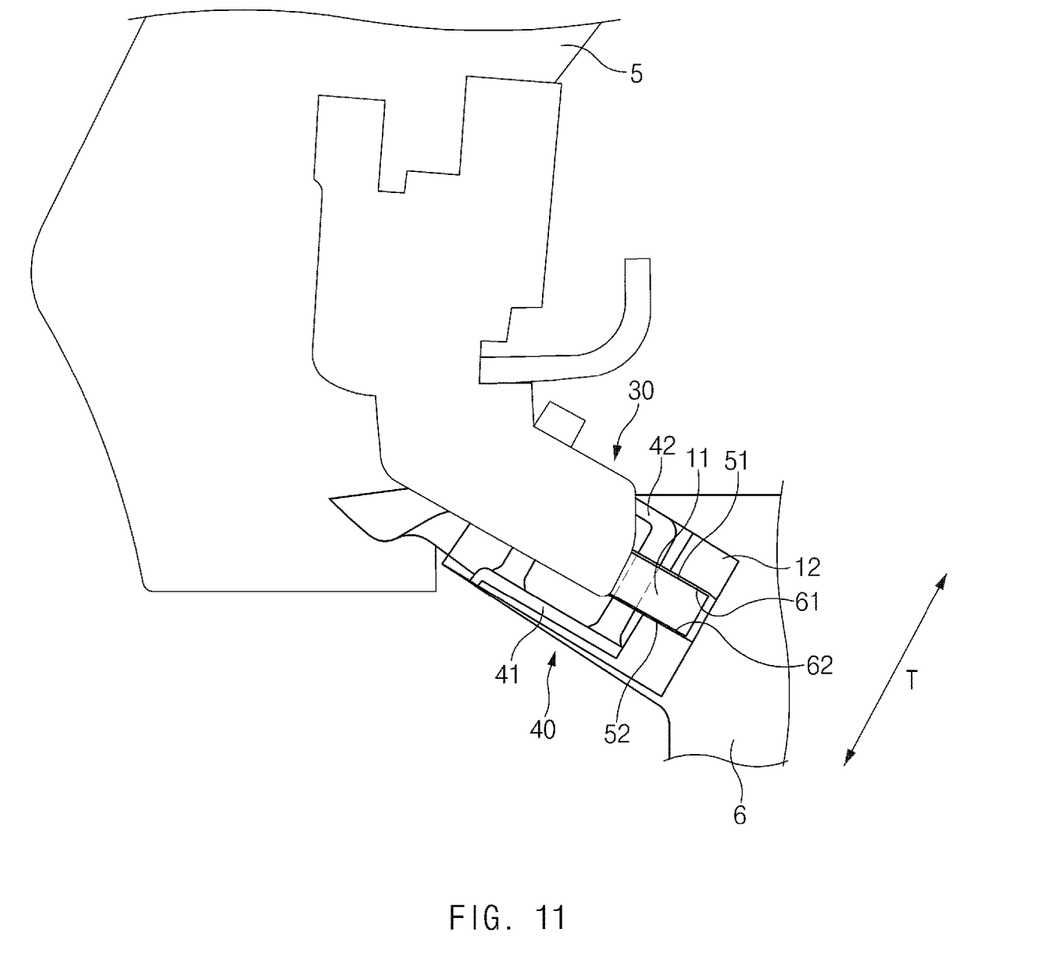
FIG. 11 is a side sectional view illustrating a state in which the first stopper members of the stopper apparatus for the vehicle tailgate are engaged with the second stopper member, according to an embodiment of the present disclosure.

As illustrated in FIGS. 3 and 11, each of the receiving apertures 14 may have a first stopper surface 61 and a second stopper surface 62 that are opposite to each other. The first stopper surface 61 of the receiving aperture 14 may make contact with the first stopper surface 51 of the corresponding first stopper member 11, and the second stopper surface 62 of the receiving aperture 14 may make contact with the second stopper surface 52 of the first stopper member 11. Accordingly, the first stopper surface 61 and the second stopper surface 62 of the receiving aperture 14 may restrict the first stopper member 11 from moving upwards and downwards.

Figure 10:
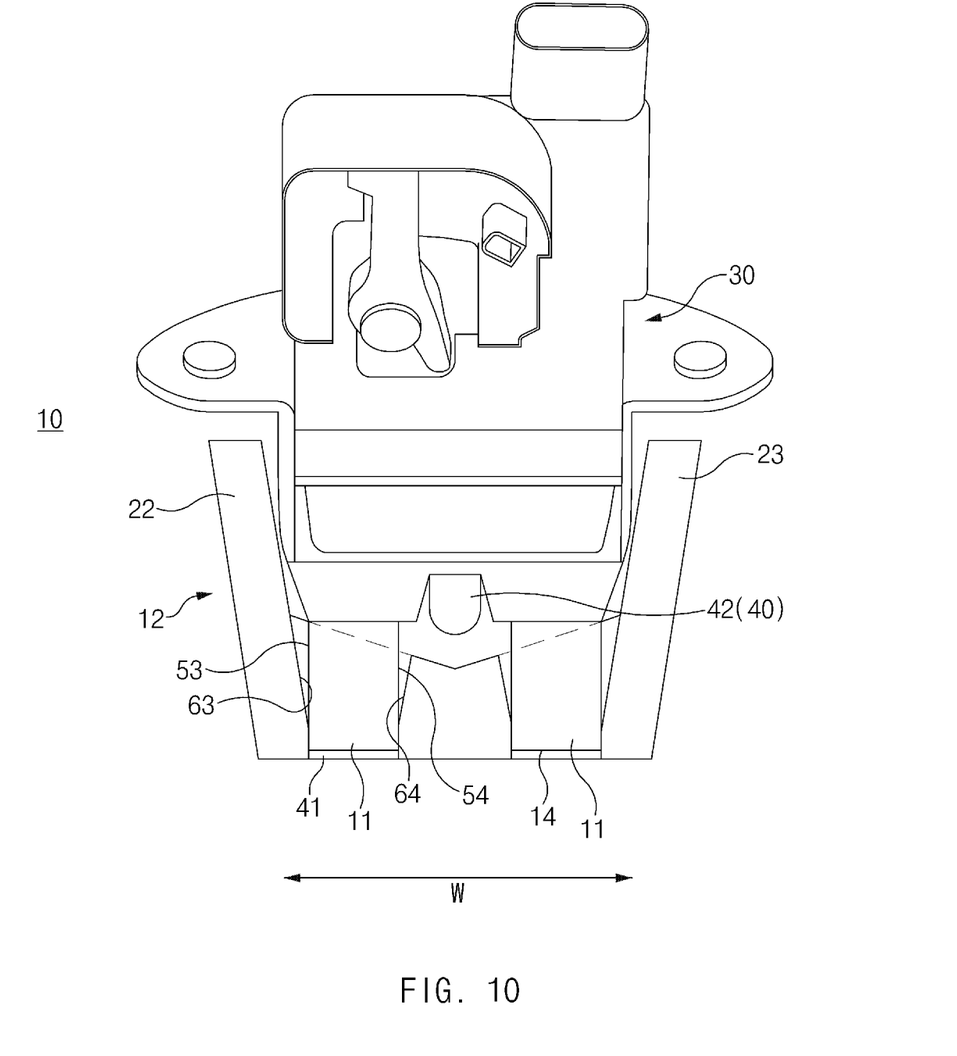
FIG. 10 is a plan view illustrating a state in which the first stopper members of the stopper apparatus for the vehicle tailgate are engaged with the second stopper member, according to an embodiment of the present disclosure.

As illustrated in FIGS. 3 and 10, the receiving aperture 14 may have a third stopper surface 63 and a fourth stopper surface 64 that are opposite to each other. The third stopper surface 63 of the receiving aperture 14 may make contact with the third stopper surface 53 of the first stopper member 11, and the fourth stopper surface 64 of the receiving aperture 14 may make contact with the fourth stopper surface 54 of the first stopper member 11. Accordingly, the third stopper surface 63 and the fourth stopper surface 64 of the receiving aperture 14 may restrict the first stopper member 11 from moving leftwards and rightwards.

As illustrated in FIG. 10, the third stopper surface 63 and the fourth stopper surface 64 of the receiving aperture 14 may be inclined at a predetermined inclination angle, and therefore the first stopper member 11 may be easily received in the receiving aperture 14.

According to an embodiment, the inclined surface 22a of the second wall 22 and the inclined surface 23a of the third wall 23 may have the same inclination angle as the third stopper surface 63 and the fourth stopper surface 64 of the receiving aperture 14.

According to another embodiment, the inclined surface 22a of the second wall 22 and the inclined surface 23a of the third wall 23 may have a different inclination angle than the third stopper surface 63 and the fourth stopper surface 64 of the receiving aperture 14.

As illustrated in FIGS. 5 to 8, the second stopper member 12 may be secured to the base plate 41 of the striker 40 through a fitting protrusion 16. The fitting protrusion 16 may be secured to the base plate 41 of the striker 40 through welding, or may be integrated with the base plate 41. The fitting protrusion 16 may be configured to surround the striker pin 42 of the striker 40. The fitting protrusion 16 may have a hook 16a formed at the top thereof.

Figure 8:
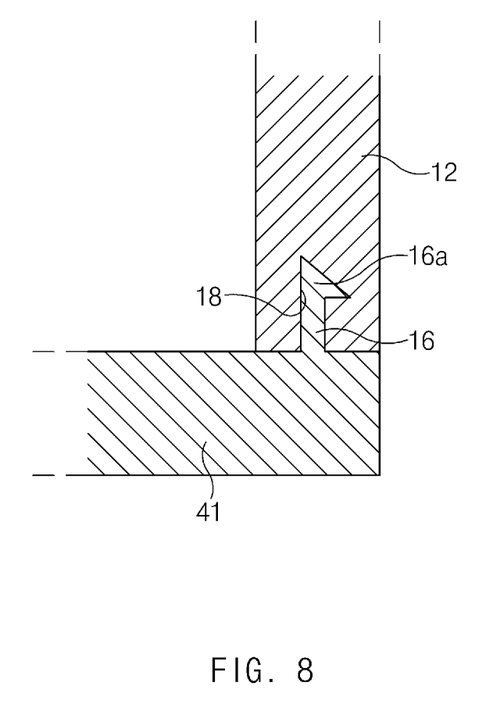
FIG. 8 is a sectional view taken along line A-A of FIG. 7.
Figure 9:
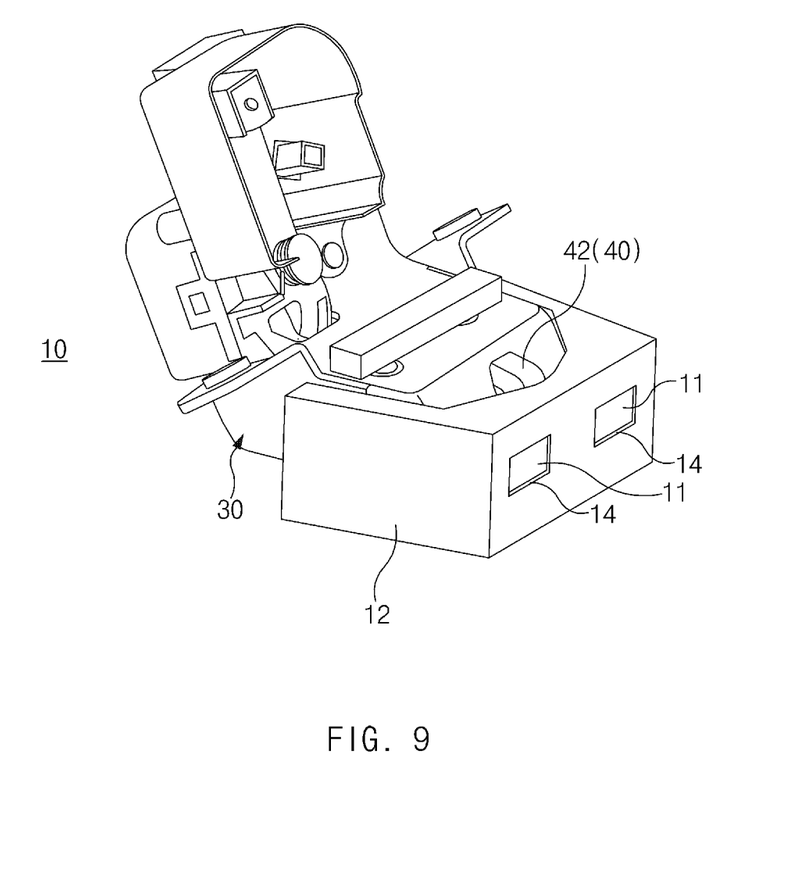
FIG. 9 is a perspective view illustrating a state in which the first stopper members of the stopper apparatus for the vehicle tailgate are engaged with the second stopper member, according to an embodiment of the present disclosure.

As illustrated in FIG. 8, the second stopper member 12 may have, on the bottom thereof, a fitting groove 18 that corresponds to the fitting protrusion 16 and the hook 16a, and the fitting protrusion 16 and the hook 16a may fit into the fitting groove 18 of the second stopper member 12 to enable the second stopper member 12 to be firmly secured to the base plate 41 of the striker 40.

As illustrated in FIG. 11, when the tailgate 5 is closed to cover the rear opening of the vehicle, the latch mechanism 30 may be received in the receiving opening 24 of the second stopper member 12 of the striker 40 and may be engaged with the striker 40. Accordingly, opposite sides of the latch mechanism 30 may be prevented from moving leftwards and rightwards in the receiving opening 24 of the second stopper member 12. The first stopper members 11 may be received in the receiving apertures 14 of the second stopper member 12 and may be constrained in an up-down direction by the first stopper surfaces 61 and the second stopper surfaces 62 of the receiving apertures 14 and in a left-right direction by the third stopper surfaces 63 and the fourth stopper surfaces 64 of the receiving apertures 14. Accordingly, the latch mechanism 30 may be restricted from moving in the up-down direction (see direction T of FIG. 11) and in the left-right direction (e.g., see direction W of FIG. 10). Since the vertical movement of the latch mechanism 30 is prevented, the tailgate 5 may be prevented from moving forwards and rearwards, and therefore lock-up booming of the tailgate 5 and noise may be prevented.

Figure 12:
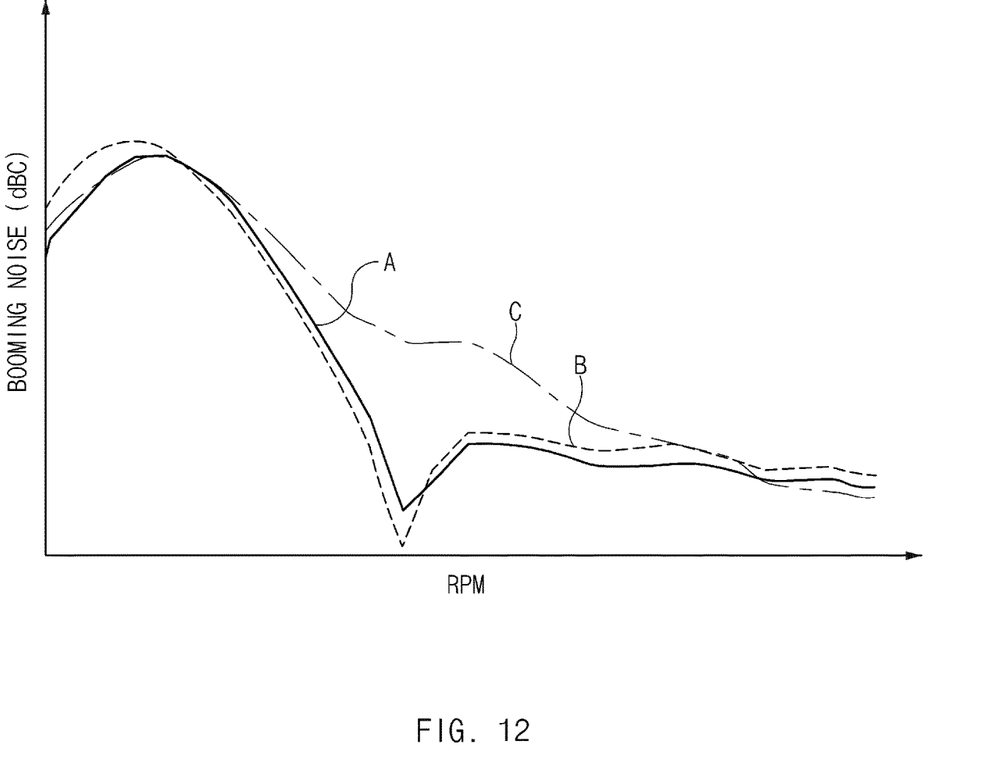
FIG. 12 is a graph depicting booming noise of a tailgate according to the present disclosure and booming noise of tailgates according to examples of the related art.

FIG. 12 is a graph depicting booming noise of a tailgate according to the present disclosure and booming noise of tailgates according to examples of the related art.

The lock-up booming (Line A) of the tailgate according to the present disclosure was significantly reduced, compared with the lock-up booming (Line B) of the tailgate according to the example of the related art to which no dynamic damper was applied and the lock-up booming (Line C) of the tailgate according to the example of the related art to which a dynamic damper was applied. For example, in the low engine RPM area, the lock-up booming (Line C) of the tailgate according to the example of the related art to which the dynamic damper was applied was reduced by about 1.8 dBC, compared with the lock-up booming (Line B) of the tailgate according to the example of the related art to which no dynamic damper was applied, and the lock-up booming (Line A) of the tailgate according to the present disclosure was reduced by about 2.2 dBC, compared with the lock-up booming (Line B) of the tailgate according to the example of the related art to which no dynamic damper was applied.

Although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure.

Therefore, exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A combination of a latch and stopper apparatus for a tailgate of a vehicle, the combination comprising:
   a latch mechanism configured to be mounted on the tailgate of the vehicle;
   one or more first stopper members secured to the latch mechanism;
   a striker configured to be attached to a vehicle body structure, the striker configured to engage with and disengage from the latch mechanism; and
   a second stopper member disposed around the striker, the second stopper member including one or more receiving apertures, each receiving aperture corresponding to one of the first stopper members for receiving the corresponding first stopper member when the striker and latch mechanism are engaged,
   wherein the second stopper member comprises a receiving opening portion, the receiving opening portion is configured to receive a part of the latch mechanism and the one or more first stoppers when the striker and the latch mechanism are engaged, and
   wherein the one or more first stopper members extend straight from the latch mechanism toward the second stopper member so that the one or more first stopper members and the second stopper member are in alignment when the striker and the latch mechanism are engaged.

2. The combination of claim 1, wherein the second stopper member is secured to the striker through a fitting protrusion and a fitting groove.

3. The combination of claim 2, wherein the fitting protrusion is secured to a base plate of the striker,
   wherein the fitting groove is formed on the second stopper member, and
   wherein the fitting protrusion fits into the fitting groove to secure the second stopper member to the base plate of the striker.

4. The combination of claim 1, wherein the second stopper member has a receiving opening in which to receive the part of the latch mechanism.

5. The combination of claim 4, wherein the second stopper member includes:
   a first wall;
   a second wall connected to one end of the first wall; and
   a third wall connected to an opposite end of the first wall,
   wherein the receiving opening is delimited by the first wall, the second wall, and the third wall.

6. The combination of claim 5, wherein an inclined surface is formed on an inner side of the second wall and the third wall, and wherein the inclined surface is inclined at a predetermined angle to a longitudinal axis of each of the first stopper members.

7. The combination of claim 1,
   wherein the receiving apertures are configured to restrict the first stopper members from moving upwards, downwards, leftwards, and rightwards.

8. The combination of claim 7, wherein the receiving apertures have a first stopper surface and a second stopper surface that restrict the first stopper members from moving upwards and downwards.

9. The combination of claim 8, wherein the receiving apertures have a third stopper surface and a fourth stopper surface that restrict the first stopper members from moving leftwards and rightwards.

10. The combination of claim 9, wherein the third stopper surface and the fourth stopper surface are inclined at a predetermined angle to a longitudinal axis of each of the first stopper members.

* * * * *